(12) United States Patent
Matsumura et al.

(10) Patent No.: US 11,943,766 B2
(45) Date of Patent: Mar. 26, 2024

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Shohei Yoshioka, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 513 days.

(21) Appl. No.: 17/268,761

(22) PCT Filed: Aug. 17, 2018

(86) PCT No.: PCT/JP2018/030584
§ 371 (c)(1),
(2) Date: Feb. 16, 2021

(87) PCT Pub. No.: WO2020/035954
PCT Pub. Date: Feb. 20, 2020

(65) Prior Publication Data
US 2021/0329674 A1   Oct. 21, 2021

(51) Int. Cl.
*H04W 72/1273*   (2023.01)
(52) U.S. Cl.
CPC ............... *H04W 72/1273* (2013.01)
(58) Field of Classification Search
None
See application file for complete search history.

(56) References Cited

U.S. PATENT DOCUMENTS

2019/0380114 A1   12/2019   Yokomakura et al.

FOREIGN PATENT DOCUMENTS

| WO | 2018-063072 A1 | 4/2018 | |
| WO | WO-2018063072 A1 * | 4/2018 | ........... H04L 1/0013 |
| WO | 2018-116788 A1 | 6/2018 | |

OTHER PUBLICATIONS

3GPP TSG RAN WG1 Meeting #94; R1-1808803 "Remaining issues on PDSCH rate matching" Spreadtrum Communications; Gothenburg, Sweden; Aug. 20-24, 2018 (5 pages).
Office Action issued in Japanese Application No. 2020-537357; dated Jul. 26, 2022 (8 pages).
(Continued)

*Primary Examiner* — Adolf Dsouza
(74) *Attorney, Agent, or Firm* — Osha Bergman Watanabe & Burton LLP

(57) ABSTRACT

To appropriately control communication even when a reference signal is dynamically triggered, a user terminal according to one aspect of the present disclosure includes: a receiving section that receives a downlink shared channel and a Channel State Information (CSI) reference signal; and a control section that, when first downlink control information used to schedule the downlink shared channel and second downlink control information used to trigger the CSI reference signal are transmitted by different cells, and resources respectively indicated by the first downlink control information and the second downlink control information overlap, performs control not to perform at least one of reception of the downlink shared channel and measurement that uses the CSI reference signal.

4 Claims, 10 Drawing Sheets

(56) References Cited

OTHER PUBLICATIONS

Extended European Search Report issued in Application No. 18930348.0 dated Feb. 18, 2022 (9 pages).
Qualcomm Incorporated, "Maintenance for PDSCH rate matching and TA", 3GPP TSG RAN WG1 Meeting #94, R1-1809430, Gothenburg, Sweden, Aug. 20-24, 2018 (8 pages).
3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).
International Search Report issued in International Application No. PCT/JP2018/030584, dated Oct. 9, 2018 (5 pages).
Written Opinion issued in International Application No. PCT/JP2018/030584; dated Oct. 9, 2018 (4 pages).
Office Action issued in Chinese Application No. 201880098565.4, dated Jun. 29, 2023 (19 pages).

\* cited by examiner

| SCS | LOW LATENCY CSI | | |
|---|---|---|---|
| | Z(1) | Z'(1) | Z''(1) |
| 15kHz | 10 or 9 | 8 or 7 | X1 |
| 30kHz | 13 | 11 | X2 |
| 60kHz | 25 | 21 | X3 |
| 120kHz | 43 | 36 | X4 |

FIG. 4

USER TERMINAL AND RADIO COMMUNICATION METHOD

TECHNICAL FIELD

The present disclosure relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of wider bands and a higher speed than those of LTE (also referred to as LTE Rel. 8 or 9), LTE-Advanced (also referred to as LTE-A or LTE Rel. 10, 11 or 12) has been specified. LTE successor systems (also referred to as, for example, Future Radio Access (FRA), the 5th generation mobile communication system (5G), 5G+ (plus), New Radio (NR), New radio access (NX), Future generation radio access (FX) or LTE Rel. 13, 14, 15 or subsequent releases) are also studied.

In legacy LTE systems (e.g., LTE Rel. 8 to 13), a UE maps an uplink signal on an appropriate radio resource to transmit to an eNB. Uplink user data is transmitted by using an uplink shared channel (PUSCH: Physical Uplink Shared Channel). Furthermore, Uplink Control Information (UCI) is transmitted by using the PUSCH when transmitted together with the uplink user data, and is transmitted by using an uplink control channel (PUCCH: Physical Uplink Control Channel) when transmitted alone.

Channel State Information (CSI) included in the UCI is information that is based on an instantaneous channel state of downlink, and is, for example, a Channel Quality Indicator (CQI), a Precoding Matrix indicator (PMI), a Precoding Type Indicator (PTI) or a Rank Indicator (RI). The CSI is periodically or aperiodically notified from the UE to the eNB.

According to Periodic CSI (P-CSI), a UE periodically transmits CSI based on a periodicity and/or a resource notified from a radio base station. On the other hand, according to Aperiodic CSI (A-CSI), the UE transmits CSI in response to a CSI reporting request (also referred to as a trigger, a CSI trigger or a CSI request) from the radio base station.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

A CSI reporting that uses a different configuration from those of legacy LTE systems (e.g., LTE Rel. 13 or prior releases) is studied for a future radio communication system (e.g., NR).

For example, it is studied that a base station dynamically notifies (e.g., triggers) a UE of a reference signal (A-CSI-RS) used for A-CSI measurement, and controls measurement and a reporting based on the A-CSI-RS. Consequently, it is possible to dynamically allocate reference signal resources (also referred to as RS resources) to the UE when necessary.

On the other hand, a case is also assumed where, when a reference signal (e.g., RS resource) is dynamically notified to the UE, the RS resource overlap (contend with) another signal or channel. However, how to handle this contention is not sufficiently studied yet.

It is therefore one of objects of the present disclosure to provide a user terminal and a radio communication method that can appropriately control communication even when a reference signal is dynamically triggered.

Solution to Problem

A user terminal according to one aspect of the present disclosure includes: a receiving section that receives a downlink shared channel and a Channel State Information (CSI) reference signal; and a control section that, when first downlink control information used to schedule the downlink shared channel and second downlink control information used to trigger the CSI reference signal are transmitted by different cells, and resources respectively indicated by the first downlink control information and the second downlink control information overlap, performs control not to perform at least one of reception of the downlink shared channel and measurement that uses the CSI reference signal.

Advantageous Effects of Invention

According to one aspect of the present disclosure, it is possible to appropriately control communication even when a reference signal is dynamically triggered.

BRIEF DESCRIPTION OF DRAWINGS

FIG. 4 is a diagram illustrating one example of a process time to be applied to given cases.

DESCRIPTION OF EMBODIMENTS

Figure 1:
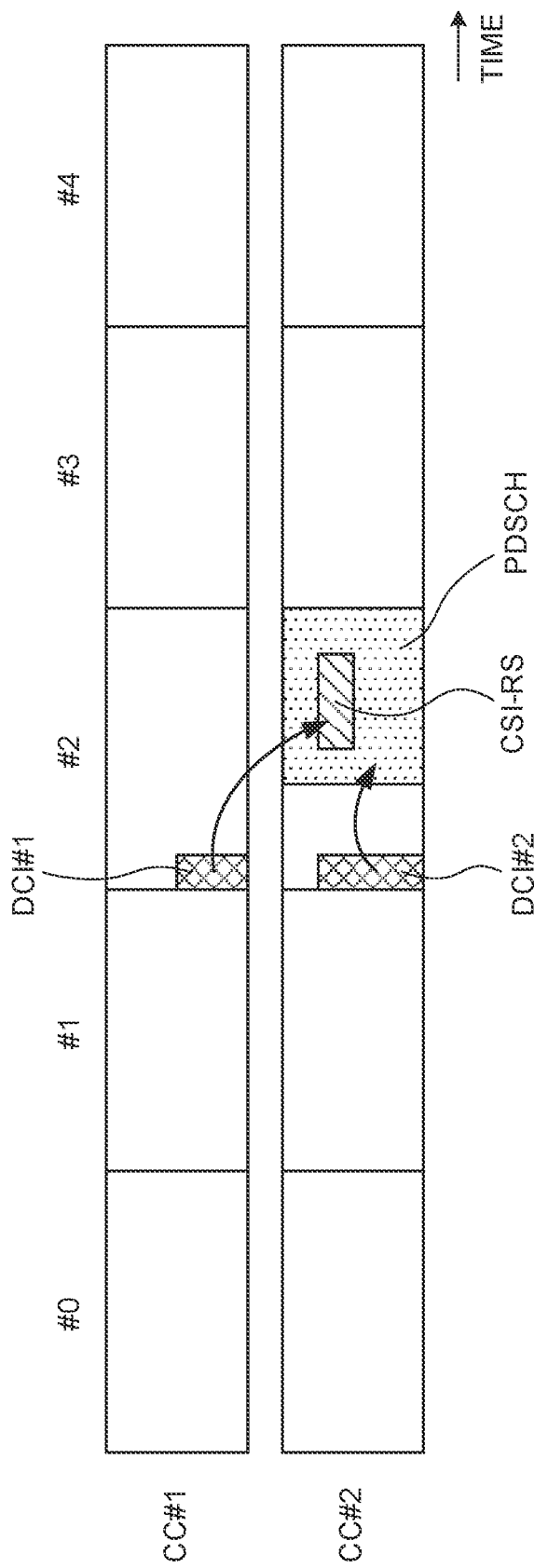
FIG. 1 is a diagram illustrating one example of a case where a PDSCH and a CSI-RS are configured to the same resource.

According to legacy LTE systems (Rel. 10 to 14), a reference signal for measuring a channel state on downlink is specified. A reference signal for channel state measurement is also referred to as a Cell-specific Reference Signal (CRS) or a Channel State Information-Reference Signal (CSI-RS), and is a reference signal that is used to measure CSI such as a Channel Quality Indicator (CQI), a Precoding Matrix Indicator (PMI) or a Rank Indicator (RI) that is a channel state.

A UE feeds back a result measured based on the reference signal for channel state measurement as Channel State Information (CSI) to a base station (that may be a network, an eNB, a gNB or a transmission/reception point) at a given timing. As a CSI feedback method, a Periodic CSI (P-CSI) reporting and an Aperiodic CSI (A-CSI) reporting are specified.

When reporting P-CSI, the UE feeds back P-CSI per given periodicity (e.g., a 5 subframe periodicity or a 10 subframe periodicity). The UE transmits the P-CSI by using an uplink control channel of a given cell (e.g., a Primary Cell (PCell), a PUCCH cell or a Primary Secondary Cell (PSCell)).

When uplink data (e.g., PUSCH) is not transmitted at a given timing (given subframe) at which the P-CSI is reported, the UE transmits the P-CSI by using an uplink control channel (e.g., PUCCH). On the other hand, when uplink data is transmitted at the given timing, the UE can transmit P-CSI by using an uplink shared channel.

When reporting A-CSI, the UE transmits A-CSI in response to a CSI trigger (CSI request) from the base station. For example, the UE reports the A-CSI a given timing (e.g., 4 subframes) after receiving the CSI trigger.

The CSI trigger notified from the base station is included in downlink control information (e.g., DCI format 0/4) for an uplink scheduling grant (UL grant) that is transmitted by using a downlink control channel. In addition, the UL grant may be DCI for scheduling transmission of UL data (e.g., PUSCH) and/or transmission of a UL sounding (measurement) signal.

The UE reports the A-CSI by using an uplink shared channel indicated by the UL grant in response to the trigger included in the downlink control information for the UL grant. Furthermore, when CA is applied, the UE can receive a UL grant (including an A-CSI trigger) for a certain cell by a downlink control channel of another cell.

It is studied for a future radio communication system (also referred to as NR) to report CSI by using a different configuration from those of legacy LTE systems.

Although the legacy LTE systems support dynamically controlling triggering of a CSI reporting, NR assumes that a reference signal (e.g., CSI-RS) used to measure or report CSI is dynamically triggered. For example, the base station uses DCI to instruct the UE to trigger an aperiodic CSI-RS.

In one example, the base station uses a DCI format (e.g., DCI format 1_1) used to schedule a PDSCH to notify the UE of a resource (CSI-RS resource) to which the CSI-RS is allocated. The CSI-RS may be a Zero Power CSI-RS (ZP CSI-RS) whose transmission power is configured to zero.

The base station may use a code point of a bit field included in the DCI to notify the UE of a given CSI-RS resource set ID. CSI-RS resource set candidates may be configured in advance from the base station to the UE by a higher layer (e.g., RRC signaling). For example, the UE may decide that a CSI-RS resource set ID #1 is triggered when the code point of the DCI is "01", a CSI-RS resource set ID #2 is triggered when the code point of the DCI is "10", and a CSI-RS resource set ID #3 is triggered when the code point of the DCI is "11". In addition, the number of bits of the bit field used to give notification of the CSI-RS resource set is not limited to 2.

Thus, by dynamically allocating CSI-RS resources when necessary instead of semi-statically allocating the CSI-RS resources, it is possible to flexibly control allocation of a resource used for CSI measurement, and improve resource use efficiency.

On the other hand, a case is also assumed where, when a CSI-RS resource (e.g., ZP CSI-RS resource set) is dynamically allocated, the CSI-RS resource and another signal or channel contend. For example, a case is assumed where the CSI-RS resource and DL data (e.g., PDSCH) resource to be transmitted to the UE overlap.

In this case, it is conceived to perform puncture processing or rate-matching processing on one (PDSCH) of the PDSCH and the CSI-RS resource, and perform reception processing on at least one of the PDSCH and the CSI-RS.

Performing the puncture processing on data refers to performing encoding assuming that resources allocated for the data can be used (or without taking an unavailable resource amount into account), yet not mapping encoded symbols on resources (e.g., CSI-RS resources) that cannot be actually used (i.e., keeping resources unused). By not using the encoded symbols of the punctured resources for decoding on a reception side, it is possible to suppress deterioration of characteristics due to the puncturing.

Performing the rate-matching processing on data refers to controlling the number of bits after encoding (encoded bits) by taking actually available radio resources into account. When the number of encoded bits is smaller than the number of bits that can be mapped on the actually available radio resources, at least part of the encoded bits may be repeated. When the number of encoded bits is larger than the number of bits that can be mapped, part of the encoded bits may be deleted.

By performing rate-matching processing, encoding is performed while taking into account a resource that becomes actually available, so that it is possible to efficiently perform encoding compared to puncture processing. Consequently, by, for example, applying rate-matching processing instead of puncture processing, it is possible to more efficiently perform encoding and generate a signal or a channel of higher quality, so that it is possible to improve communication quality.

On the other hand, when rate-matching processing is applied, the reception side cannot perform demodulation unless the reception side knows that the rate-matching has been applied. However, when puncture processing is applied, the reception side can appropriately perform a reception operation even if the reception side does not know that the puncture processing has been applied.

Furthermore, it is assumed that a processing load of rate-matching processing (e.g., transmission processing or reception processing to which the rate-matching processing is applied) is higher than that of puncture processing (e.g., transmission processing or reception processing to which the rate-matching processing is applied). Therefore, it is preferable to apply the puncture processing to transmission/ reception without a spare processing time, and apply the rate-matching processing to transmission/reception with the spare processing time.

Therefore, it is conceived to perform puncture processing on one (e.g., PDSCH) of a CSI-RS and the PDSCH from a viewpoint of communication quality when the CSI-RS and the PDSCH overlap.

By the way, a case is also assumed where, when communication is performed by using a plurality of cells (or CCs) (e.g., CA), a cell that transmits DCI and a cell that triggers a CSI-RS (or a CSI-RS resource) by the DCI are different (see FIG. 1). FIG. 1 illustrates one example of a case where DCI #1 transmitted by a CC #1 triggers a CSI-RS of a CC #2 (or allocates a CSI-RS resource), and DCI #2 transmitted by the CC #2 schedules a PDSCH of the CC #2. Furthermore, FIG. 1 illustrates a case where a CSI-RS resource and a PDSCH resource indicated by pieces of DCI transmitted respectively by different cells are configured to overlap.

Thus, according to NR, it is also conceived to permit (or support) overlapping of a PDSCH resource scheduled by DCI of a given cell, and a CSI-RS resource triggered by DCI transmitted by another cell. In this case, when receiving the PDSCH scheduled by the given cell, the UE needs to take into account pieces of DCI (e.g., whether or not a CSI-RS is triggered (or a CSI-RS resource is allocated) by DCI of each cell) transmitted by all cells. Hence, a case also occurs where, when a CSI-RS and a PDSCH overlap, the UE has difficulty in applying rate-matching processing to the PDSCH.

The inventors of the present invention have conceived an appropriate UE operation and base station operation in a case where a CSI-RS is dynamically triggered by taking into account that there is a case where a cell that transmits DCI for triggering the CSI-RS and a cell that triggers the CSI-RS by the DCI are different, or a case where the DCI for triggering the CSI-RS and DCI for scheduling a PDSCH are different.

An embodiment according to the present disclosure will be described in detail below with reference to the drawings. Each aspect may be each applied alone or may be applied in combination.

In this description, "overlap" means that a plurality of signals or channels are transmitted (scheduled) in the same resource (e.g., at least one of a frequency resource or a time resource), yet the meaning of "overlap" is not limited to this. "Overlap" includes a case, too, where part of resources of a plurality of signals or channels overlap.

In the following description, a CSI-RS may be read as an A-CSI-RS, a Zero Power CSI-RS (ZP CSI-RS) or a Non Zero Power CSI-RS (NZP CSI-RS).

(First Aspect)

According to the first aspect, when a PDSCH resource (e.g., Resource Element (RE)) and an A-CSI-RS resource overlap, application of rate-matching processing to a PDSCH is restricted based on a given condition.

<UE Operation 1-1>

A UE assumes a case (case 1) where a CC (or a cell) that transmits DCI for triggering a CSI-RS and a CC that triggers the CSI-RS are different, and the CSI-RS and the PDSCH are configured to the same resource. In this case, the UE may perform reception processing assuming that rate-matching processing is not applied to the PDSCH (see FIG. 2).

Figure 2:
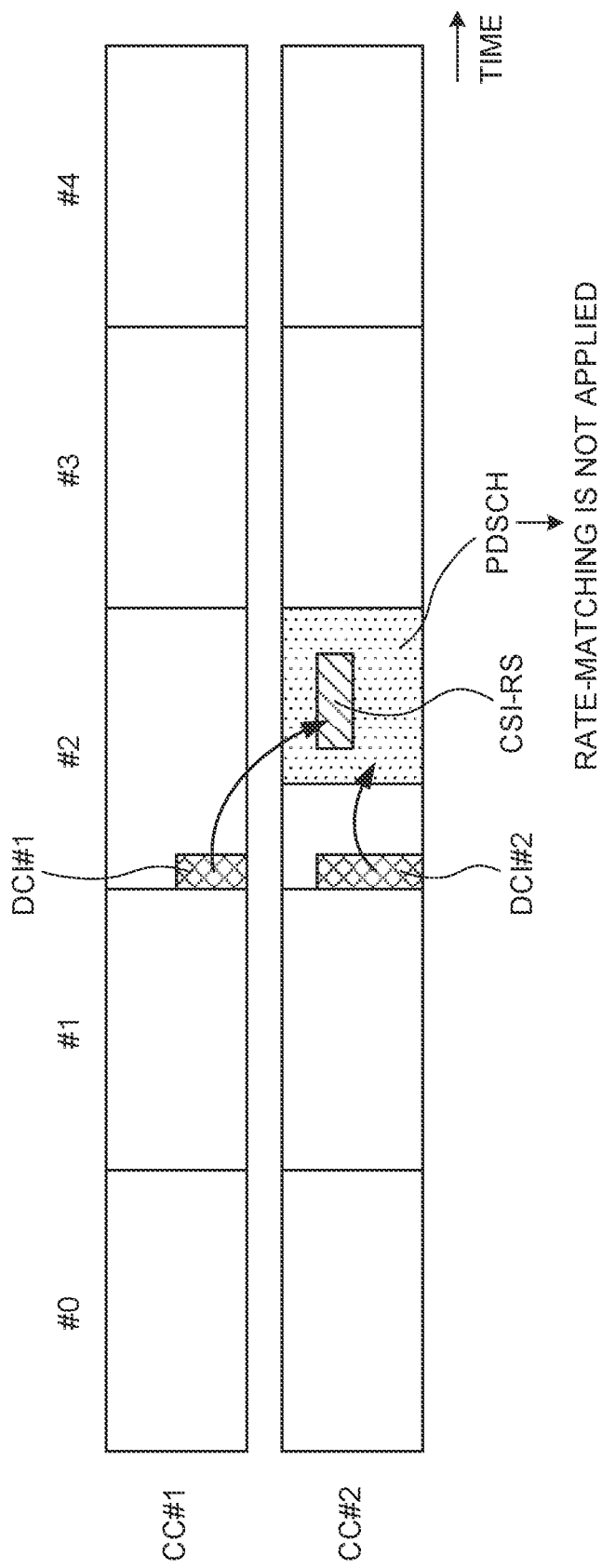
FIG. 2 is a diagram illustrating one example of reception processing in a case where the PDSCH and the CSI-RS are configured to the same resource.

FIG. 2 illustrates a case where DCI #1 transmitted by a CC #1 triggers a CSI-RS of a CC #2 (or allocates the CSI-RS resource), and the CSI-RS and a PDSCH transmitted by the CC #2 overlap. The PDSCH may be scheduled by DCI #2 transmitted by the CC #2. In FIG. 2, the UE performs reception processing on the PDSCH assuming that rate-matching processing is not applied to the PDSCH that overlaps the CSI-RS (e.g., a part that overlaps the CSI-RS).

In this case, the UE may perform reception processing assuming that puncture processing is applied to the PDSCH. Furthermore, the UE may measure and report CSI by using the CSI-RS transmitted by an A-CSI-RS resource (e.g., a resource in which the PDSCH has been punctured) notified by DCI.

Figure 3:
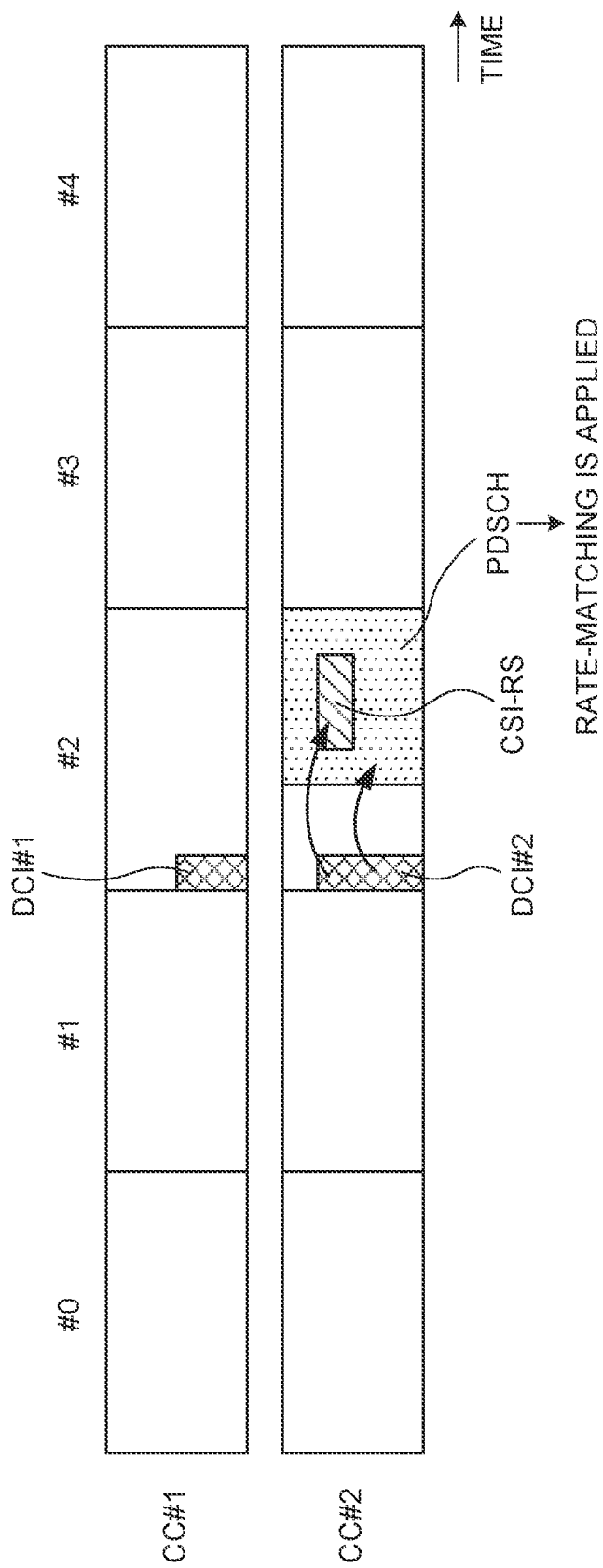
FIG. 3 is a diagram illustrating another example of the reception processing in the case where the PDSCH and the CSI-RS are configured to the same resource.

On the other hand, in a case other than the case 1, the UE may perform reception processing assuming that, even when the CSI-RS and the PDSCH are configured to the same resource, rate-matching processing is applied to the PDSCH (see FIG. 3). FIG. 3 illustrates a case where the DCI #2 transmitted by the CC #2 triggers the CSI-RS of the CC #2 (or allocates the CSI-RS resource), and schedules a PDSCH transmitted by the CC #2. In this case, the UE performs reception processing on the PDSCH and the CSI-RS assuming that rate-matching processing is applied to the PDSCH. In this regard, a configuration other than the case 1 is not limited to that in FIG. 3.

Consequently, compared to a case where puncture processing is always performed when the CSI-RS and the PDSCH are configured to the same resource, it is possible to apply rate-matching processing to cases other than the case 1, so that it is possible to improve communication quality.

In addition, the case 1 may be a case where a CC that transmits DCI for triggering the CSI-RS and a CC that transmits DCI for scheduling the PDSCH are different, and the CSI-RS and the PDSCH are configured to the same resource. Alternatively, the case 1 may be a case where DCI for triggering the CSI-RS and DCI for scheduling the PDSCH are different, and the CSI-RS and the PDSCH are configured to the same resource.

<UE Operation 1-2>

The UE may control application of rate-matching processing to a PDSCH based on supported or reported UE capability. For example, a case is assumed where the UE reports given UE capability information.

The given UE capability information may be at least one of whether or not cross-carrier scheduling is supported, and whether or not a DL search space is commonly supported for CA. For example, the UE that supports cross-carrier scheduling between CCs to which the same numerology is applied notifies a base station of that the UE supports cross-carrier scheduling. Furthermore, the UE that has capability for sharing a DL search space of a plurality of CCs to which CA is applied (or capability for making it possible to configure DCI of a plurality of CCs to a common DL search space).

The UE that has this UE capability can perform reception processing with high performance even when a signal or a channel transmitted (or triggered) by a given cell is scheduled (or triggered) by DCI of another cell.

In a case where the UE has the given UE capability, when a CSI-RS and a PDSCH are configured to the same resource, the UE may perform reception processing assuming that rate-matching processing is applied to the PDSCH. That is, when reporting the given UE capability information, the UE may perform rate-matching processing on the PDSCH irrespectively of a cell that transmits DCI for triggering the CSI-RS, a CC that triggers the CSI-RS and a cell that transmits DCI used to schedule the PDSCH.

Consequently, even when the CSI-RS resource and the PDSCH resource overlap, the UE that has the given UE capability can apply rate-matching processing to the PDSCH, so that it is possible to improve communication quality.

On the other hand, when the UE does not have the given UE capability, the UE may perform control to perform the above UE operation 1.

<UE Operation 1-3>

The UE may control application of rate-matching processing to a PDSCH based on whether or not a higher layer parameter associated with supported or reported UE capability is configured.

For example, a case is assumed where the UE reports given UE capability information. In this regard, the given UE capability information may be the same as the capability information described in the UE operation 2.

When a higher layer parameter associated with the given UE capability is configured from the base station, the UE may perform reception processing assuming that rate-matching processing is applied to a PDSCH that is scheduled to the same resource as that of a CSI-RS. When, for example, the UE gives notification of that the UE supports cross-carrier scheduling, and the higher layer parameter regarding control of the cross-carrier scheduling is configured from the base station, the UE assumes that rate-matching processing is applied to the PDSCH.

Consequently, even when a CSI-RS resource and a PDSCH resource overlap, the UE to which the higher layer parameter associated with the given UE capability has been configured can apply rate-matching processing to the PDSCH, so that it is possible to improve communication quality.

On the other hand, when the higher layer parameter associated with the given UE capability is not configured to the UE, the UE may perform control to perform the above UE operation 1.

<Variation 1>

When a cell that transmits DCI for triggering a CSI-RS and a cell that triggers the CSI-RS are different, the UE may operate as follows.

Except in a case where the given condition holds, the UE performs reception processing assuming that a PDSCH is not rate-matched in a resource in which the CSI-RS (e.g., a Non Zero Power CSI-RS (NZP CSI-RS)) and the PDSCH overlap. Consequently, it is possible to suppress an increase in a UE processing load.

The case where the given condition holds corresponds to a case where, in an overlapping resource, a CSI-RS is triggered by UL DCI (e.g., DCI used to schedule a PDSCH), and a last symbol in a time domain of a PDCCH in which the UL DCI is transmitted is received at least a given number of symbols (e.g., 14 symbols) before a first symbol of the PDSCH. In addition, an SCS that serves as a criterion to decide the number of symbols may be the smallest SCS among CCs in which the PDSCH and the PDCCH are transmitted. Consequently, when a reception processing time can be reserved, it is possible to apply rate-matching processing, and improve communication quality.

Alternatively, the UE performs reception processing assuming that the PDSCH is not rate-matched in a resource in which a CSI-RS (e.g., ZP CSI-RS) resource triggered (or scheduled) by DL DCI other than DCI for scheduling the PDSCH, and the PDSCH overlap.

<Variation 2>

When a cell that transmits DCI for triggering a CSI-RS and a cell that triggers the CSI-RS are the same, and resources of the CSI-RS and the PDSCH overlap, the UE may operate as follows.

The UE may perform reception processing assuming that the PDSCH is not rate-matched in the overlapping resource. In this case, the UE may assume that the PDSCH is punctured.

Except in a case where the given condition holds, the UE may perform reception processing assuming that the PDSCH is not rate-matched in a resource in which the CSI-RS (e.g., NZP CSI-RS) and the PDSCH overlap.

The case where the given condition holds corresponds to a case where, in the overlapping resource, a CSI-RS is triggered by UL DCI (e.g., DCI used to schedule a PUSCH), and a last symbol in the time domain of a PDCCH in which the UL DCI is transmitted is received at least a given number of symbols (e.g., 7 symbols) before a first symbol of the PDSCH. In addition, an SCS that serves as a criterion to decide the number of symbols may be the smallest SCS among CCs in which the PDSCH and the PDCCH are transmitted.

(Second Aspect)

According to the second aspect, in given cases, control is performed such that a CSI-RS and a PDSCH are not configured to the same resource. For example, in the given cases, a UE does not assume that the CSI-RS and the PDSCH are configured to the same resource, or controls reception of the PDSCH and the CSI-RS assuming that a CSI-RS resource and a PDSCH resource do not overlap.

The given cases may be at least one of following (1) to (3).

(1) A case where DCI for scheduling a PDSCH and DCI for triggering a CSI-RS are transmitted by different CCs (or cells)

(2) A case where for scheduling a PDSCH and DCI for triggering a CSI-RS are different (3) A case where a CC (or a cell) that transmits DCI for triggering a CSI-RS, and a CC that triggers a CSI-RS are different In one of the above cases (1) to (3), the UE performs reception processing assuming that the CSI-RS and the PDSCH are not configured to the same resource. In this case, a base station controls allocation of resources of the CSI-RS and the PDSCH such that the CSI-RS and the PDSCH are not configured to the same resource in the above cases (1) to (3).

Thus, by performing control such that the CSI-RS and the PDSCH are not configured to the same resource in the given cases, it is possible to suppress the CSI-RS from puncturing the PDSCH. Consequently, it is possible to simplify a UE operation, and reduce a UE processing load.

In addition, a case also occurs where the CSI-RS and the PDSCH are configured to the same resource in cases other than the above cases (1) to (3). In this case, the UE may perform reception processing assuming that rate-matching processing (or puncture processing) is applied to the PDSCH.

On the other hand, when a PDSCH resource scheduled by first DCI and a CSI-RS resource triggered by second DCI overlap in one of the above cases (1) to (3), the UE may perform control to perform at least one of following operations (2-1 to 2-4).

<UE Operation 2-1>

The UE performs control to measure (or receive) a CSI-RS and not to perform reception processing on a PDSCH. In this case, the UE may ignore DCI for scheduling the PDSCH.

<UE Operation 2-2>

The UE performs control to perform reception processing on a PDSCH and not to measure (or receive) a CSI-RS. In this case, the UE may ignore DCI for triggering the CSI-RS.

<UE Operation 2-3>

The UE performs control not to measure (or receive) a CSI-RS and not to perform reception processing on a PDSCH. In this case, the UE may ignore DCI for scheduling the PDSCH and DCI for triggering the CSI-RS.

<UE Operation 2-4>

The UE performs control to measure (or receive) a CSI-RS and to perform reception processing on a PDSCH, too. In this case, the UE may perform reception processing assuming that the PDSCH is punctured.

When not measuring the CSI-RS (e.g., the UE operation 2-2 or 2-3), the UE may perform control not to transmit a CSI-RS measurement result (or a CSI-RS reporting) For example, the UE may transmit the CSI-RS measurement result to the base station without including the CSI-RS measurement result in a given reporting result. The given reporting result may be a result of at least one of a beam reporting, beam failure detection, Radio Link Monitoring (RLM), CSI measurement and Radio Resource Management (RRM).

Alternatively, when not measuring the CSI-RS (e.g., the UE operation 2-2 or 2-3), the UE may include the CSI-RS measurement result in the given reporting result assuming that a value that is not based on the triggered CSI-RS has been measured. The value that is not based on the CSI-RS may be a value calculated uniquely by the UE, or may be, for example, a previously measured result (e.g., latest measurement result) or a value calculated based on the previously measured result.

When measuring the CSI-RS (e.g., the UE operation 2-1 or 2-4), the UE may include the CSI-RS measurement result (or the CSI-RS reporting) in the given reporting result to transmit. Alternatively, the UE may transmit the CSI-RS measurement result without including the CSI-RS measurement result in the given reporting result.

When not receiving the PDSCH (e.g., the UE operation 2-1 or 2-3), the UE may perform control to transmit NACK for the PDSCH. The base station that has received the NACK from the UE controls retransmission of the PDSCH. Alternatively, the UE may perform control not to transmit the NACK for the PDSCH. In this case, the base station controls retransmission of the PDSCH assuming that the UE does not receive the PDSCH when resources of the CSI-RS and the PDSCH overlap. Consequently, it is possible to simplify the UE operation.

When receiving the PDSCH (e.g., the UE operation 2-2 or 2-4), the UE may perform control to transmit HARQ-ACK (ACK or NACK) for the PDSCH. The base station that has received the HARQ-ACK from the UE controls retransmission of the PDSCH. Alternatively, the UE may perform control not to transmit the HARQ-ACK for the PDSCH.

Thus, by performing control such that the CSI-RS and the PDSCH are not configured to the same resource in the given cases, it is possible to simplify reception processing of the CSI-RS and the PDSCH in the UE.

(Third Aspect)

According to the third aspect, control is performed to apply a given process time in given cases. For example, a UE applies different process times in the given cases, and in cases other than the given cases (other cases).

The given cases may be at least one of following (1) to (3).

(1) A case where DCI for scheduling a PDSCH and DCI for triggering a CSI-RS are transmitted by different CCs (or cells)

(2) A case where DCI for scheduling a PDSCH and DCI for triggering a CSI-RS are different (3) A case where a CC (or a cell) that transmits DCI for triggering a CSI-RS, and a CC that triggers a CSI-RS are different The process time may be a duration (e.g., symbols) taken until the UE reports CSI after measuring the CSI. Alternatively, the process time may be a duration taken until the UE reports CSI after receiving a CSI-RS resource.

For example, in the given cases, the UE may control the CSI-RS measurement and the CSI reporting by applying a longer process time than those of the other cases. The process time applied in the given cases, and process times applied in the other cases (e.g., normal cases) may be defined in a table. For example, a process time may be defined per subcarrier spacing.

In one example, a table in which two types of process times (e.g., $Z(1)$ and $Z'(1)$) are defined per subcarrier spacing (e.g., 15 kHz, 30 kHz, 60 kHz and 120 kHz) may be used for the normal cases (see FIG. 4). Furthermore, a table in which one type of a process time (e.g., $Z''(1)$) is defined per subcarrier spacing may be used for the given cases (see FIG. 4). In addition, values in FIG. 4 are one example, and are not limited to these.

In this case, the process time (e.g., $Z''(1)$) to be applied to the given cases may be configured longer than the process times (e.g., $Z(1)$ and $Z'(1)$) to be applied to the normal cases to at least one subcarrier spacing. In FIG. 4, for example, X1 may be made larger than 9 or 10, X2 may be made larger than 13, X3 may be made larger than 25, and X4 may be made larger than 43. Naturally, values of X1 to X4 are not limited to these.

In addition, the process time applied by the UE may be configured by using at least one of a higher layer (e.g., RRC signaling) and downlink control information from a base station, or may be autonomously selected by the UE.

Alternatively, the process time of the given cases may be determined based on the process times of the normal cases. For example, in addition to the two types of the process times (e.g., $Z(1)$ and $Z'(1)$) of the normal cases, process times (e.g., X and X') of the given cases matching the two types of the process times may be defined. In this case, the process times to be applied to the given cases may be configured longer than the process times to be applied to the normal cases to at least one subcarrier spacing.

Thus, by configuring the process times of the given cases longer than the process times of the other cases, a great number of UEs can appropriately report CSI even when a cell that transmits DCI for triggering the CSI-RS and a cell that triggers the CSI-RS are different.

<UE Operation 3-1>

When there is a sufficient process time (e.g., the process time is a given value or more), the UE may assume that a PDSCH in the given cases is subjected to rate-matching processing. On the other hand, when the process time is less than the given value, the UE may not assume that the PDSCH in the given cases is scheduled. For example, the UE may perform control not to receive the PDSCH, or may perform control to ignore DCI that has scheduled the PDSCH (i.e., control not to receive the DCI).

In addition, the process times described herein may be the above-described process times (at least one of $Z(1)$, $Z'(1)$, $Z''(1)$, X and X'), or may be process times for another operation (e.g., an operation performed until a PDSCH is received after DCI is received).

Furthermore, the UE may assume that a CSI-RS is measured (or received). Alternatively, the UE may assume that the CSI-RS is not measured (or received).

<UE Operation 3-2>

When there is a sufficient process time (when, for example, the process time is the given value or more), the UE may assume that a PDSCH in the given cases is subjected to rate-matching processing. On the other hand, when the process time is less than the given value, the UE may perform control to receive the PDSCH assuming that the PDSCH in the given cases is not subjected to rate-matching processing.

In addition, the process times described herein may be the above-described process times (at least one of $Z(1)$, $Z'(1)$, $Z''(1)$, X and X'), or may be process times for another operation (e.g., an operation performed until a PDSCH is received after DCI is received).

Furthermore, the UE may perform reception processing (e.g., decoding or demodulation) on the PDSCH assuming that a CSI-RS is not transmitted. In this case, the UE may ignore DCI (or DCK field) for triggering the CSI-RS.

Alternatively, the UE may perform reception processing on the PDSCH assuming that the PDSCH is punctured in a resource of the PDSCH that overlaps the CSI-RS.

Thus, by controlling reception processing of at least one of the PDSCH and the CSI-RS based on a given process time, it is possible to appropriately perform reception processing by taking processing capability or a processing load of the UE into account.

(Radio Communication System)

The configuration of the radio communication system according to an embodiment of the present disclosure will be described below. This radio communication system uses at least one or a combination of the radio communication method described in the above embodiment to perform communication.

Figure 5:
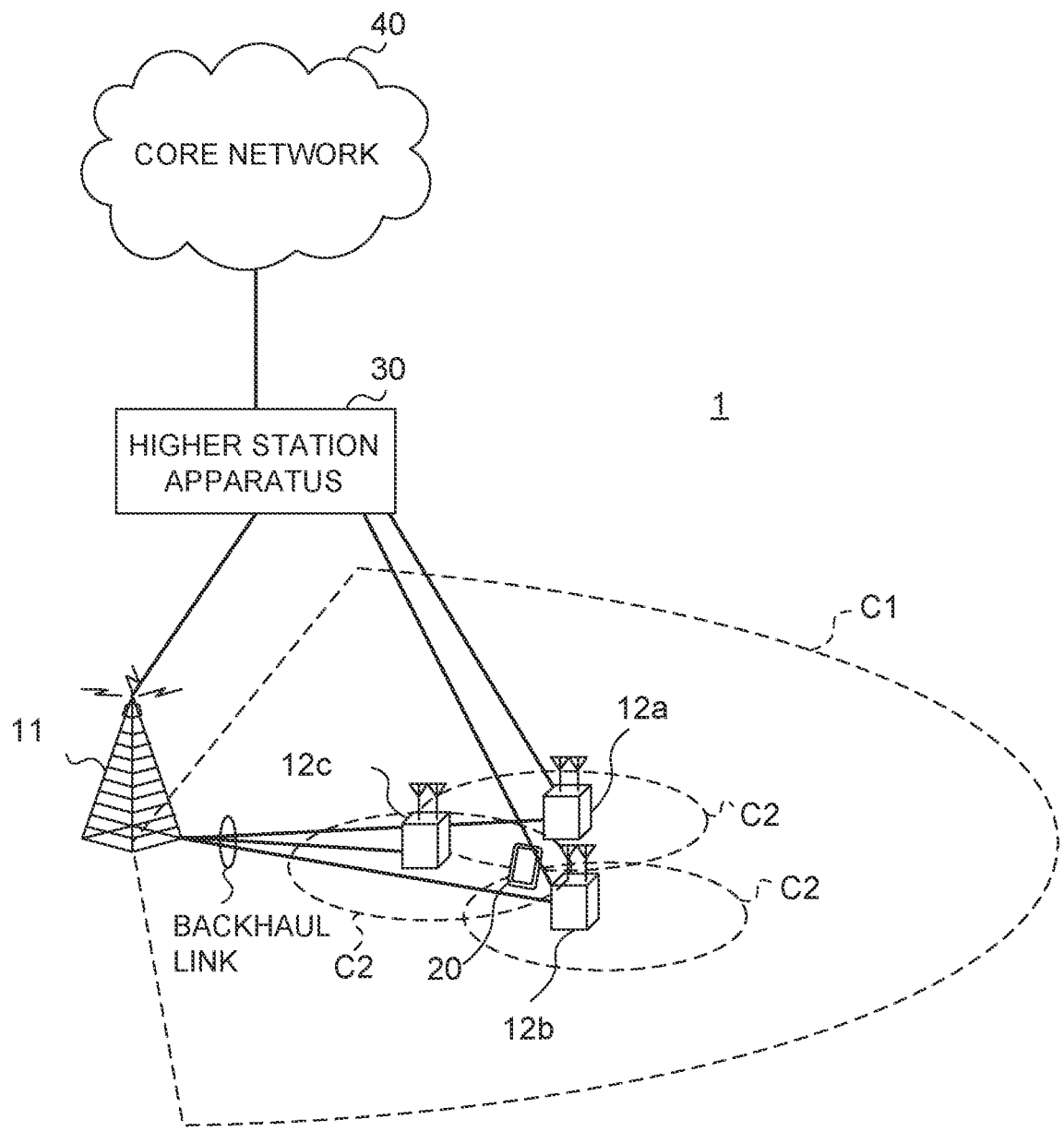
FIG. 5 is a diagram illustrating one example of a schematic configuration of a radio communication system according to one embodiment.

FIG. 5 is a diagram illustrating one example of a schematic configuration of the radio communication system according to the one embodiment. A radio communication system 1 can apply Carrier Aggregation (CA) and/or Dual Connectivity (DC) that aggregate a plurality of base frequency blocks (component carriers) whose 1 unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), New Radio (NR), Future Radio Access (FRA) and the New Radio Access Technology (New-RAT), or a system that realizes these techniques.

Furthermore, the radio communication system 1 may support dual connectivity between a plurality of Radio Access Technologies (RATs) (Multi-RAT Dual Connectivity (MR-DC)). ML-DC may include, for example, Dual Connectivity of LTE and NR (EN-DC: E-UTRA-NR Dual Connectivity) where a base station (eNB) of LTE (E-UTRA) is a Master Node (MN), and a base station (gNB) of NR is a Secondary Node (SN), and dual connectivity of NR and LTE (NE-DC: NR-E-UTRA Dual Connectivity) where a base station (gNB) of NR is an MN, and a base station (eNB) of LTE (E-UTRA) is an SN.

The radio communication system 1 includes a base station 11 that forms a macro cell C1 of a relatively wide coverage, and base stations 12 (12a to 12c) that are located in the macro cell C1 and form small cells C2 narrower than the macro cell C1. Furthermore, a user terminal 20 is located in the macro cell C1 and each small cell C2. An arrangement and the numbers of respective cells and the user terminals 20 are not limited to the aspect illustrated in FIG. 5.

The user terminal 20 can connect with both of the base station 11 and the base stations 12. The user terminal 20 is assumed to concurrently use the macro cell C1 and the small cells C2 by using CA or DC. Furthermore, the user terminal 20 can apply CA or DC by using a plurality of cells (CCs) (e.g., five CCs or less or six CCs or more).

The user terminal 20 and the base station 11 can communicate by using a carrier (also referred to as a legacy carrier) of a narrow bandwidth in a relatively low frequency band (e.g., 2 GHz). On the other hand, the user terminal 20 and each base station 12 may use a carrier of a wide bandwidth in a relatively high frequency band (e.g., 3.5 GHz or 5 GHz) or may use the same carrier as that used between the user terminal 20 and the base station 11. In this regard, a configuration of the frequency band used by each base station is not limited to this.

Furthermore, the user terminal 20 can perform communication by using Time Division Duplex (TDD) and/or Frequency Division Duplex (FDD) in each cell. Furthermore, each cell (carrier) may be applied a single numerology or may be applied a plurality of different numerologies.

The numerology may be a communication parameter to be applied to transmission and/or reception of a certain signal and/or channel, and may indicate at least one of, for example, a subcarrier spacing, a bandwidth, a symbol length, a cyclic prefix length, a subframe length, a TTI length, the number of symbols per TTI, a radio frame configuration, specific filtering processing performed by a transceiver in a frequency domain, and specific windowing processing performed by the transceiver in a time domain.

For example, a case where subcarrier spacings of constituent OFDM symbols are different and/or a case where the numbers of OFDM symbols are different on a certain physical channel may be read as that numerologies are different.

The base station 11 and each base station 12 (or the two base stations 12) may be connected by way of wired connection (e.g., optical fibers compliant with a Common Public Radio Interface (CPRI) or an X2 interface) or radio connection.

The base station 11 and each base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each base station 12 may be connected with the higher station apparatus 30 via the base station 11.

In this regard, the base station 11 is a base station that has a relatively wide coverage, and may be referred to as a macro base station, an aggregate node, an eNodeB (eNB) or a transmission/reception point. Furthermore, each base station 12 is a base station that has a local coverage, and may be referred to as a small base station, a micro base station, a pico base station, a femto base station, a Home eNodeB (HeNB), a Remote Radio Head (RRH) or a transmission/reception point. The base stations 11 and 12 will be collectively referred to as a base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and applies Single Carrier-Frequency Division Multiple Access (SC-FDMA) and/or OFDMA to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into bands including one or contiguous resource blocks per terminal and causes a plurality of terminals to use respectively different bands to reduce an inter-terminal interference. In this regard, uplink and downlink radio access schemes are not limited to a combination of these schemes, and other radio access schemes may be used.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and a System Information Block (SIB) are conveyed on the PDSCH. Furthermore, a Master Information Block (MIB) is conveyed on the PBCH.

The downlink L1/L2 control channel includes at least one of downlink control channels (a Physical Downlink Control Channel (PDCCH) and/or an Enhanced Physical Downlink Control Channel (EPDCCH)), a Physical Control Format Indicator Channel (PCFICH), and a Physical Hybrid-ARQ Indicator Channel (PHICH). Downlink Control Information (DCI) including scheduling information of the PDSCH and/or the PUSCH is conveyed on the PDCCH.

In addition, the scheduling information may be notified by the DCI. For example, DCI for scheduling DL data reception may be referred to as a DL assignment, and DCI for scheduling UL data transmission may be referred to as a UL grant.

The number of OFDM symbols used for the PDCCH is conveyed on the PCFICH. Transmission acknowledgement information (also referred to as, for example, retransmission control information, HARQ-ACK or ACK/NACK) of a Hybrid Automatic Repeat reQuest (HARQ) for the PUSCH is conveyed on the PHICH. The EPDCCH is subjected to frequency division multiplexing with the PDSCH (downlink shared data channel) and is used to convey DCI similar to the PDCCH.

The radio communication system 1 uses an uplink shared channel (PUSCH: Physical Uplink Shared Channel) shared by each user terminal 20, an uplink control channel (PDCCH: Physical Uplink Control Channel), and a random access channel (PRACH: Physical Random Access Channel) as uplink channels. User data and higher layer control information are conveyed on the PUSCH. Furthermore, downlink radio link quality information (CQI: Channel Quality Indicator), transmission acknowledgement information and a Scheduling Request (SR) are conveyed on the PUCCH. A random access preamble for establishing connection with a cell is conveyed on the PRACH.

The radio communication system 1 conveys a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 conveys a Sounding Reference Signal (SRS) and a DeModulation Reference Signal (DMRS) as uplink reference signals. In this regard, the DMRS may be referred to as a user terminal-specific reference signal (UE-specific reference signal). Furthermore, a reference signal to be conveyed is not limited to these.

<Base Station>

Figure 6:
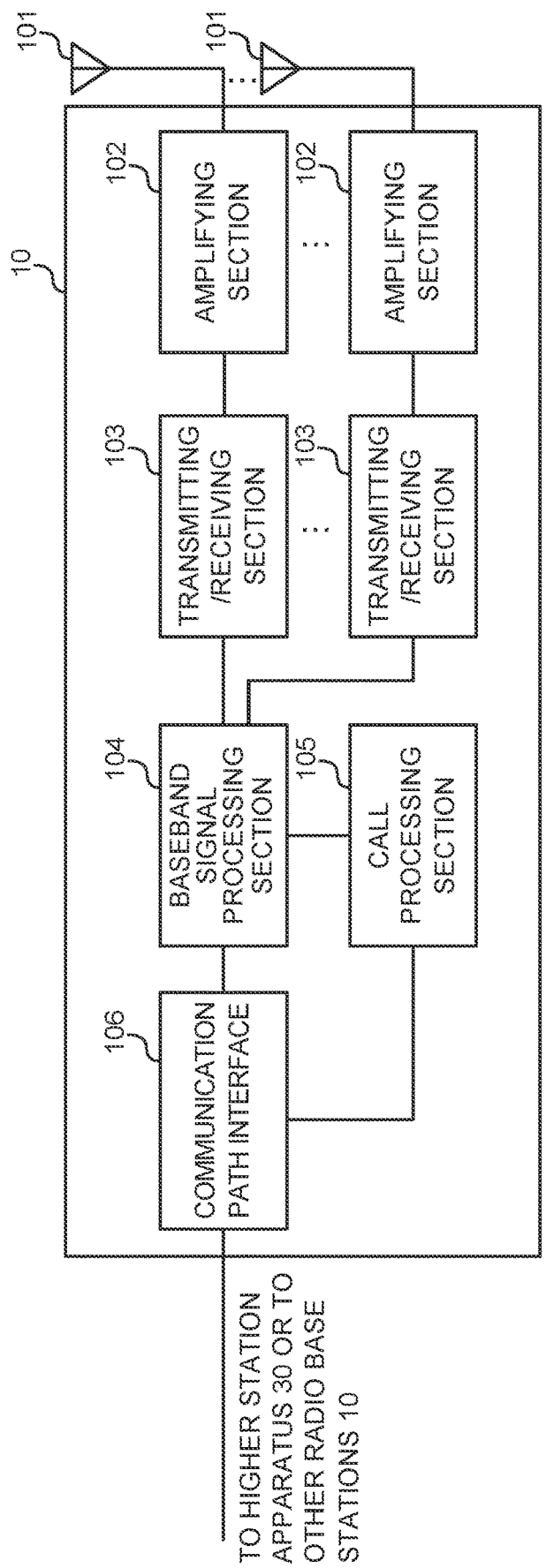
FIG. 6 is a diagram illustrating one example of an overall configuration of a base station according to the one embodiment.

FIG. 6 is a diagram illustrating one example of an overall configuration of the base station according to the one embodiment. The base station 10 includes pluralities of transmission/reception antennas 101, amplifying sections 102 and transmitting/receiving sections 103, a baseband signal processing section 104, a call processing section 105 and a communication path interface 106. In this regard, the base station 10 only needs to be configured to include one or more of each of the transmission/reception antennas 101, the amplifying sections 102 and the transmitting/receiving sections 103.

User data transmitted from the base station 10 to the user terminal 20 on downlink is input from the higher station apparatus 30 to the baseband signal processing section 104 via the communication path interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmitting/receiving section 103. Furthermore, the baseband signal processing section 104 performs transmission processing such as channel coding and inverse fast Fourier transform on a downlink control signal, too, and transfers the downlink control signal to each transmitting/receiving section 103.

Each transmitting/receiving section 103 converts a baseband signal precoded and output per antenna from the baseband signal processing section 104 into a radio frequency range, and transmits a radio frequency signal. The radio frequency signal subjected to frequency conversion by each transmitting/receiving section 103 is amplified by each amplifying section 102, and is transmitted from each transmission/reception antenna 101. The transmitting/receiving sections 103 can be composed of transmitters/receivers, transmission/reception circuits or transmission/reception apparatuses described based on a common knowledge in a technical field according to the present disclosure. In this regard, the transmitting/receiving sections 103 may be composed as an integrated transmitting/receiving section or may be composed of transmitting sections and receiving sections.

Meanwhile, each amplifying section 102 amplifies a radio frequency signal received by each transmission/reception antenna 101 as an uplink signal. Each transmitting/receiving section 103 receives the uplink signal amplified by each amplifying section 102. Each transmitting/receiving section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, MAC retransmission control reception processing, and reception processing of an RLC layer and a PDCP layer on user data included in the input uplink signal, and transfers the user data to the higher station apparatus 30 via the communication path interface 106. The call processing section 105 performs call processing (such as configuration and release) of a communication channel, state management of the base station 10 and radio resource management.

The communication path interface 106 transmits and receives signals to and from the higher station apparatus 30 via a given interface. Furthermore, the communication path interface 106 may transmit and receive (backhaul signaling) signals to and from the another base station 10 via an inter-base station interface (e.g., optical fibers compliant with the Common Public Radio Interface (CPRI) or the X2 interface).

In addition, each transmitting/receiving section 103 may further include an analog beam forming section that performs analog beam forming. The analog beam forming section can be composed of an analog beam forming circuit (e.g., a phase shifter or a phase shift circuit) or an analog beam forming apparatus (e.g., a phase shifter) described based on the common knowledge in the technical field according to the present disclosure. Furthermore, each transmission/reception antenna 101 can be composed of an array antenna, for example. Furthermore, each transmitting/receiving section 103 is configured to be able to apply single BF and multiple BF.

Each transmitting/receiving section 103 may transmit a signal by using a transmission beam, and receive a signal by using a reception beam. Each transmitting/receiving section 103 may transmit and/or receive a signal by using a given beam determined by a control section 301.

Each transmitting/receiving section 103 may receive and/or transmit various pieces of information described in each of the above embodiment from and/or to the user terminal 20. For example, each transmitting/receiving section 103 transmits a downlink shared channel and a Channel State Information (CSI) reference signal. Furthermore, each transmitting/receiving section 103 receives DCI for scheduling the downlink shared channel, and DCI for triggering the CSI reference signal.

Figure 7:
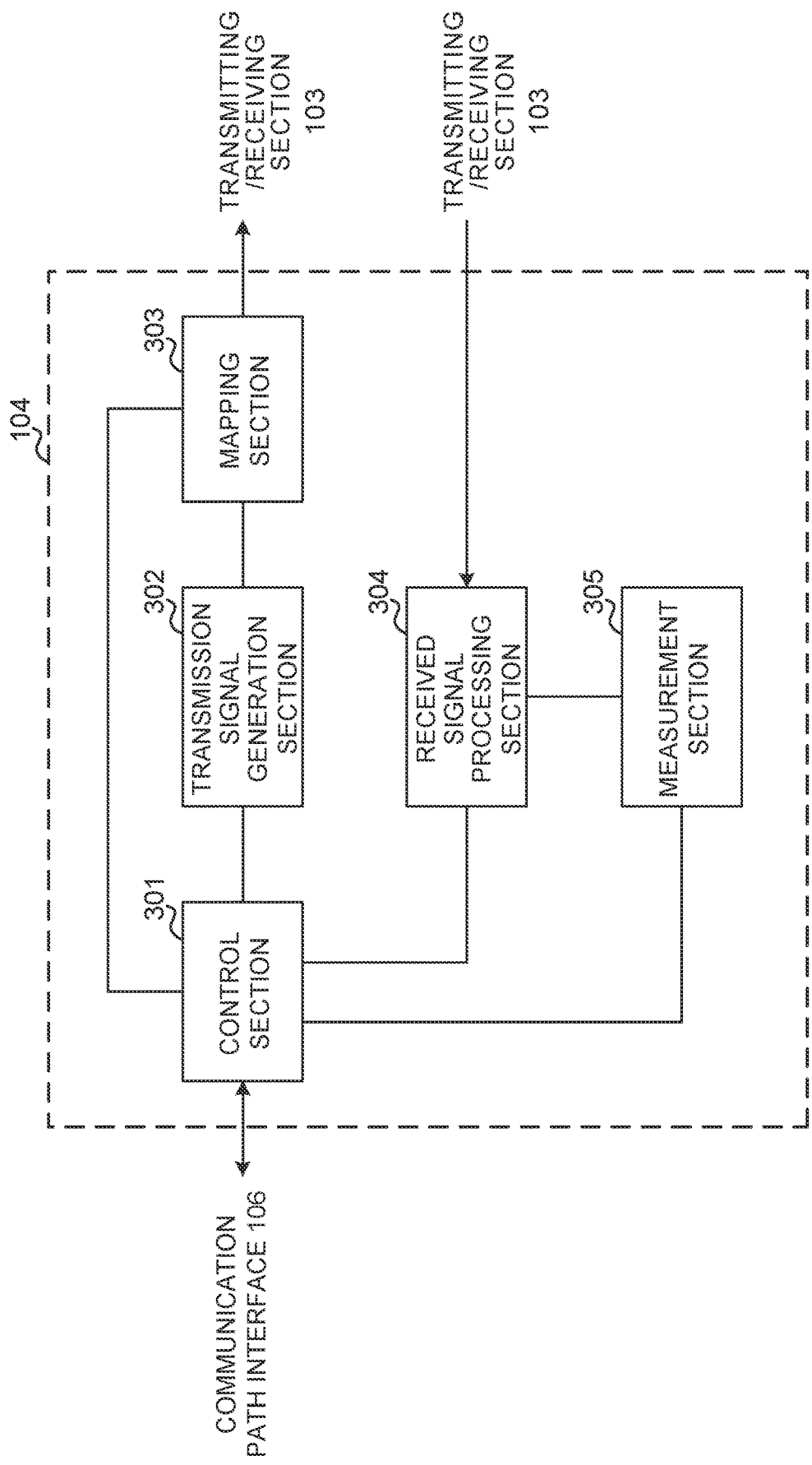
FIG. 7 is a diagram illustrating one example of a function configuration of the base station according to the one embodiment.

FIG. 7 is a diagram illustrating one example of a function configuration of the base station according to the one embodiment. In addition, this example mainly illustrates function blocks of characteristic portions according to the present embodiment, and assumes that the base station 10 includes other function blocks, too, that are necessary for radio communication.

The baseband signal processing section 104 includes at least the control section (scheduler) 301, a transmission signal generating section 302, a mapping section 303, a received signal processing section 304 and a measurement section 305. In addition, these components only need to be included in the base station 10, and part or all of the components may not be included in the baseband signal processing section 104.

The control section (scheduler) 301 controls the entire base station 10. The control section 301 can be composed of a controller, a control circuit or a control apparatus described based on the common knowledge in the technical field according to the present disclosure.

The control section 301 controls, for example, signal generation of the transmission signal generating section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal that is transmitted on the PDSCH), and a downlink control signal (e.g., a signal that is transmitted on the PDCCH and/or the EPDCCH and is, for example, transmission acknowledgement information). Furthermore, the control section 301 controls generation of a downlink control signal and a downlink data signal based on a result obtained by deciding whether or not it is necessary to perform retransmission control on an uplink data signal.

The control section 301 controls scheduling of synchronization signals (e.g., PSS/SSS) and downlink reference signals (e.g., a CRS, a CSI-RS and a DMRS).

The control section 301 may perform control for forming a transmission beam and/or a reception beam by using digital BF (e.g., precoding) in the baseband signal processing section 104 and/or analog BF (e.g., phase rotation) in each transmitting/receiving section 103.

In a given case (e.g., a case where first downlink control information for scheduling the downlink shared channel and second downlink control information for triggering the CSI-RS are transmitted by different cells), the control section 301 may perform control such that a resource for the downlink shared channel and a resource for the CSI-RS do not overlap.

The transmission signal generating section 302 generates a downlink signal (such as a downlink control signal, a downlink data signal or a downlink reference signal) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present disclosure.

The transmission signal generating section 302 generates, for example, a DL assignment for giving notification of downlink data allocation information, and/or a UL grant for giving notification of uplink data allocation information based on the instruction from the control section 301. The DL assignment and the UL grant are both DCI, and conform to a DCI format. Furthermore, the transmission signal generating section 302 performs encoding processing and modulation processing on the downlink data signal according to a code rate and a modulation scheme determined based on Channel State Information (CSI) from each user terminal 20. Various CSI reportings are received via a PUCCH and a PUSCH.

The mapping section 303 maps the downlink signal generated by the transmission signal generating section 302, on given radio resources based on the instruction from the control section 301, and outputs the downlink signal to each transmitting/receiving section 103. The mapping section 303 can be composed of a mapper, a mapping circuit or a mapping apparatus described based on the common knowledge in the technical field according to the present disclosure.

The received signal processing section 304 performs reception processing (e.g., demapping, demodulation and decoding) on a received signal input from each transmitting/receiving section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present disclosure.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present disclosure.

For example, the measurement section 305 may perform Radio Resource Management (RRM) measurement or Channel State Information (CSI) measurement based on the received signal. The measurement section 305 may measure received power (e.g., Reference Signal Received Power (RSRP)), received quality (e.g., Reference Signal Received Quality (RSRQ), a Signal to Interference plus Noise Ratio (SINR) or a Signal to Noise Ratio (SNR)), a signal strength (e.g., a Received Signal Strength indicator (RSSI)) or channel information (e.g., CSI). The measurement section 305 may output a measurement result to the control section 301.

<User Terminal>

Figure 8:
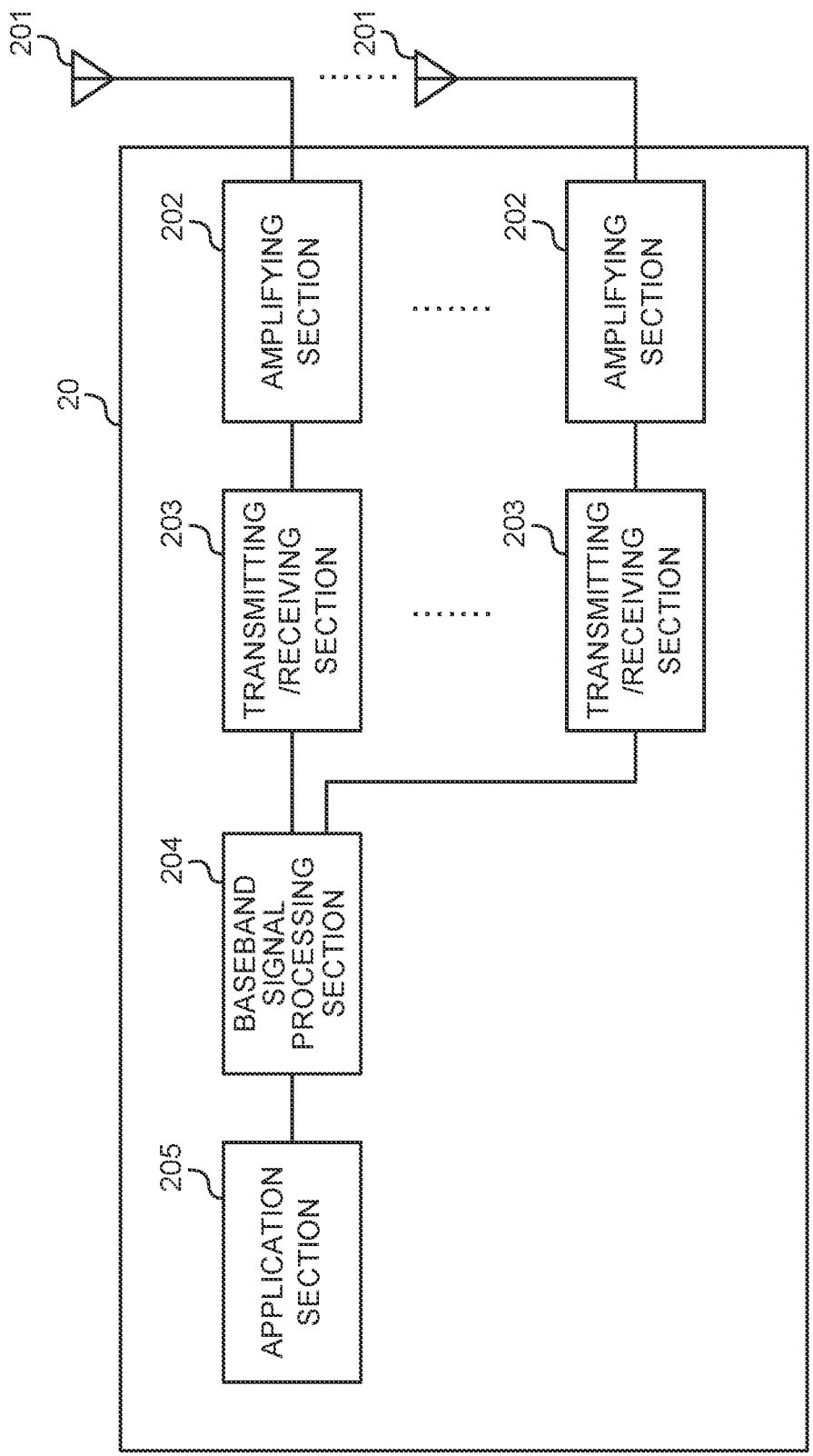
FIG. 8 is a diagram illustrating one example of an overall configuration of a user terminal according to the one embodiment.

FIG. 8 is a diagram illustrating one example of an overall configuration of the user terminal according to the one embodiment. The user terminal 20 includes pluralities of transmission/reception antennas 201, amplifying sections 202 and transmitting/receiving sections 203, a baseband signal processing section 204 and an application section 205. In this regard, the user terminal 20 only needs to be configured to include one or more of each of the transmission/reception antennas 201, the amplifying sections 202 and the transmitting/receiving sections 203.

Each amplifying section 202 amplifies a radio frequency signal received at each transmission/reception antenna 201. Each transmitting/receiving section 203 receives a downlink signal amplified by each amplifying section 202. Each transmitting/receiving section 203 performs frequency conversion on the received signal into a baseband signal, and outputs the baseband signal to the baseband signal processing section 204. The transmitting/receiving sections 203 can be composed of transmitters/receivers, transmission/reception circuits or transmission/reception apparatuses described based on the common knowledge in the technical field according to the present disclosure. In this regard, the transmitting/receiving sections 203 may be composed as an integrated transmitting/receiving section or may be composed of transmitting sections and receiving sections.

The baseband signal processing section 204 performs FFT processing, error correcting decoding and retransmission control reception processing on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information of the downlink data, too, to the application section 205.

On the other hand, the application section 205 inputs uplink user data to the baseband signal processing section 204. The baseband signal processing section 204 performs retransmission control transmission processing (e.g., HARQ transmission processing), channel coding, preceding, Discrete Fourier Transform (DFT) processing and IFFT processing on the uplink user data, and transfers the uplink user data to each transmitting/receiving section 203.

Each transmitting/receiving section 203 converts the baseband signal output from the baseband signal processing section 204 into a radio frequency range, and transmits a radio frequency signal. The radio frequency signal subjected to the frequency conversion by each transmitting/receiving section 203 is amplified by each amplifying section 202, and is transmitted from each transmission/reception antenna 201.

Each transmitting/receiving section 203 receives the downlink shared channel and the Channel State Information (CSI) reference signal. Furthermore, each transmitting/receiving section 203 receives the DCI for scheduling the downlink shared channel, and the DCI for triggering the CSI reference signal.

Figure 9:
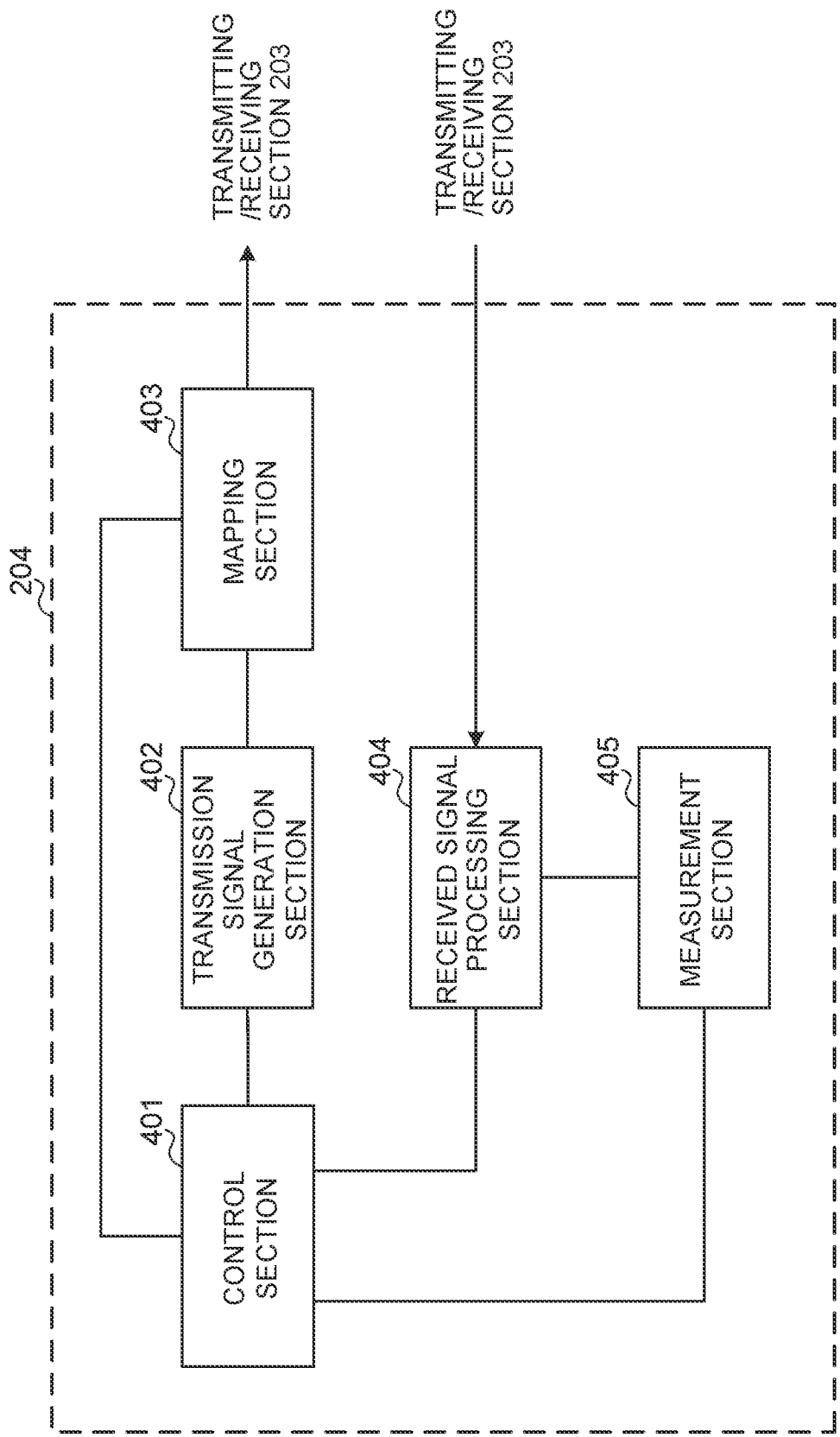
FIG. 9 is a diagram illustrating one example of a function configuration of the user terminal according to the one embodiment.

FIG. 9 is a diagram illustrating one example of a function configuration of the user terminal according to the one embodiment. In addition, this example mainly illustrates function blocks of characteristic portions according to the present embodiment, and assumes that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present disclosure.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 obtains from the received signal processing section 404 a downlink control signal and a downlink data signal transmitted from the base station 10. The control section 401 controls generation of an uplink control signal and/or an uplink data signal based on a result obtained by deciding whether or not it is necessary to perform retransmission control on the downlink control signal and/or the downlink data signal.

The control section 401 may control reception processing of the downlink shared channel based on at least one of cells that respectively transmit first downlink control information used to schedule the downlink shared channel, and second downlink control information used to trigger the CSI reference signal, the cells that respectively transmit the second downlink control information and the CSI reference signal, and resources that are respectively indicated by the first downlink control information and the second downlink control information.

When, for example, the cell that transmits the second downlink control information and the cell that triggers the CSI reference signal based on the second downlink control information are different, and when resources of the downlink shared channel and the CSI reference signal overlap, the control section 401 may control reception processing assuming that the downlink shared channel is not rate-matched.

Furthermore, the control section 401 may decide whether or not the downlink shared channel is rate-matched based on whether or not given UE capability is supported or whether or not the given UE capability is configured from the base station. Furthermore, when the first downlink control information and the second downlink control information are transmitted by different cells, the control section 401 may assume that the resource for the downlink shared channel and the resource for the CSI reference signal do not overlap.

Furthermore, when a resource in which the first downlink control information and the second downlink control information transmitted by the different cells overlap is indicated, or when a resource in which the first downlink control information and the second downlink control information to be separately transmitted overlap is indicated, the control section 401 may control reception processing based on a process time to be configured.

Furthermore, according to a configuration where control is performed such that the CSI-RS and the PDSCH are not configured to the same resource, when the first downlink control information used to schedule the downlink shared channel and the second downlink control information used to trigger the CSI reference signal are transmitted by the different cells, and the resources respectively indicated by the first downlink control information and the second downlink control information overlap, the control section 401 may perform control not to perform at least one of reception of the downlink shared channel and measurement that uses the CSI reference signal.

For example, the control section 401 may ignore at least one of the first downlink control information and the second downlink control information. Furthermore, when the measurement that uses the CSI reference signal is not performed, the control section 401 may perform control to report a value calculated without using the CSI reference signal.

Alternatively, according to a configuration where control is performed such that the CSI-RS and the PDSCH are not configured to the same resource, when the first downlink control information used to schedule the downlink shared channel and the second downlink control information used to trigger the CSI reference signal are transmitted by the different cells, and the resources respectively indicated by the first downlink control information and the second downlink control information overlap, the control section 401 may perform control to perform both of reception of the downlink shared channel and measurement that uses the CSI reference signal.

Furthermore, the control section 401 may decide whether or not the downlink shared channel is rate-matched based on the process time to be configured.

The transmission signal generating section 402 generates an uplink signal (such as an uplink control signal, an uplink data signal or an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present disclosure.

The transmission signal generating section 402 generates, for example, an uplink control signal related to transmission acknowledgement information and Channel State Information (P-CSI, A-CSI or SP-CSI) based on the instruction from the control section 401. Furthermore, the transmission signal generating section 402 generates an uplink data signal based on the instruction from the control section 401. When, for example, the downlink control signal notified from the base station 10 includes a UL grant, the transmission signal generating section 402 is instructed by the control section 401 to generate an uplink data signal.

The mapping section 403 maps the uplink signal generated by the transmission signal generating section 402, on radio resources based on the instruction from the control section 401, and outputs the uplink signal to each transmitting/receiving section 203. The mapping section 403 can be composed of a mapper, a mapping circuit or a mapping apparatus described based on the common knowledge in the technical field according to the present disclosure.

The received signal processing section 404 performs reception processing (e.g., demapping, demodulation and decoding) on the received signal input from each transmitting/receiving section 203. In this regard, the received signal is, for example, a downlink signal (such as a downlink control signal, a downlink data signal or a downlink reference signal) transmitted from the base station 10. The received signal processing section 404 can be composed of a signal processor, a signal processing circuit or a signal processing apparatus described based on the common knowledge in the technical field according to the present disclosure. Furthermore, the received signal processing section 404 can compose the receiving section according to the present disclosure.

The received signal processing section 404 outputs information decoded by the reception processing to the control section 401. The received signal processing section 404 outputs, for example, broadcast information, system information, an RRC signaling and DCI to the control section 401. Furthermore, the received signal processing section 404 outputs the received signal and/or the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present disclosure.

For example, the measurement section 405 may perform RRM measurement or CSI measurement based on the received signal. The measurement section 405 may measure received power (e.g., RSRP), received quality (e.g., RSRQ, an SINR or an SNR), a signal strength (e.g., RSSI) or channel information (e.g., CSI). The measurement section 405 may output a measurement result to the control section 401.

(Hardware Configuration)

In addition, the block diagrams used to describe the above embodiment illustrate blocks in function units. These function blocks (components) are realized by an arbitrary combination of at least one of hardware and software. Furthermore, a method for realizing each function block is not limited in particular. That is, each function block may be realized by using one physically or logically coupled apparatus or may be realized by using a plurality of these apparatuses formed by connecting two or more physically or logically separate apparatuses directly or indirectly (by using, for example, wired connection or radio connection). Each function block may be realized by combining software with the above one apparatus or a plurality of above apparatuses.

In this regard, the functions include judging, determining, deciding, calculating, computing, processing, deriving, investigating, looking up, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, and assigning, yet are not limited to these. For example, a function block (component) that causes transmission to function may be referred to as a transmitting unit/section or a transmitter. As described above, the method for realizing each function block is not limited in particular.

Figure 10:
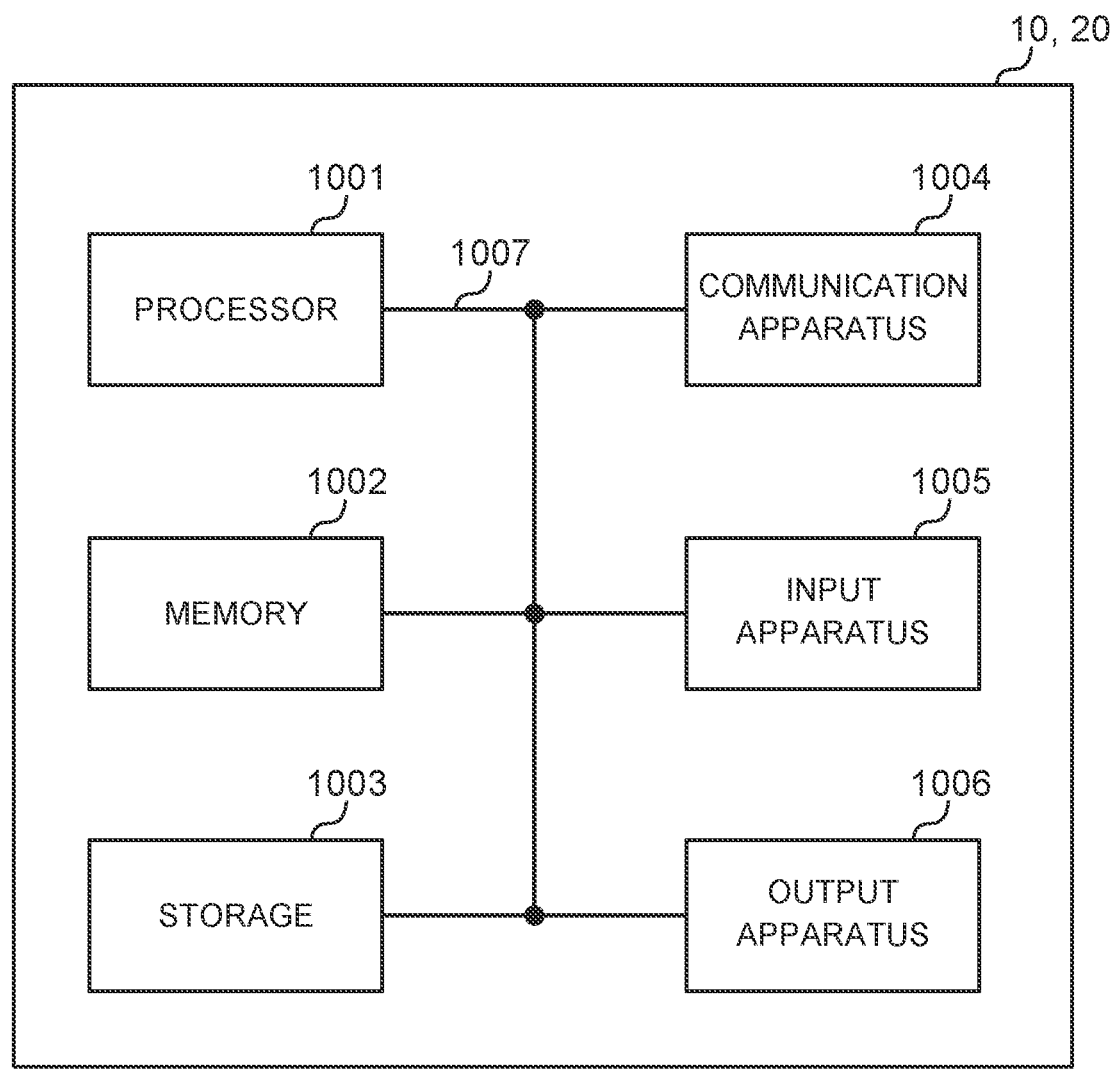
FIG. 10 is a diagram illustrating one example of hardware configurations of the base station and the user terminal according to the one embodiment.

For example, the base station and the user terminal according to the one embodiment of the present disclosure may function as computers that perform processing of the radio communication method according to the present disclosure. FIG. 10 is a diagram illustrating one example of the hardware configurations of the base station and the user terminal according to the one embodiment. The above-described base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the base station 10 and the user terminal 20 may be configured to include one or a plurality of apparatuses illustrated in FIG. 10 or may be configured without including part of the apparatuses.

For example, FIG. 10 illustrates the only one processor 1001. However, there may be a plurality of processors. Furthermore, processing may be executed by 1 processor or processing may be executed by 2 or more processors concurrently or successively or by using another method. In addition, the processor 1001 may be implemented by 1 or more chips.

Each function of the base station 10 and the user terminal 20 is realized by, for example, causing hardware such as the processor 1001 and the memory 1002 to read given software (program), and thereby causing the processor 1001 to perform an operation, and control communication via the communication apparatus 1004 and control at least one of reading and writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above-described baseband signal processing section 104 (204) and call processing section 105 may be realized by the processor 1001.

Furthermore, the processor 1001 reads programs (program codes), a software module or data from at least one of the storage 1003 and the communication apparatus 1004 out to the memory 1002, and executes various types of processing according to these programs, software module or data. As the programs, programs that cause the computer to execute at least part of the operations described in the above-described embodiment are used. For example, the control section 401 of the user terminal 20 may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to perform the radio communication method according to the one embodiment of the present disclosure.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via at least one of a wired network and a radio network, and is also referred to as, for example, a network device, a network controller, a network card and a communication module. The communication apparatus 1004 may be configured to include a high frequency switch, a duplexer, a filter and a frequency synthesizer to realize at least one of, for example, Frequency Division Duplex (FDD) and Time Division Duplex (TDD). For example, the above-described transmission/reception antennas 101 (201), amplifying sections 102 (202), transmitting/receiving sections 103 (203) and communication path interface 106 may be realized by the communication apparatus 1004. Each transmitting/receiving section 103 may be physically or logically separately implemented as a transmitting section 103a and a receiving section 103b.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using different buses between apparatuses.

Furthermore, the base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or entirety of each function block. For example, the processor 1001 may be implemented by using at least one of these types of hardware.

(Modified Example)

In addition, each term that has been described in the present disclosure and each term that is necessary to understand the present disclosure may be replaced with terms having identical or similar meanings. For example, at least one of a channel and a symbol may be a signal (signaling). Furthermore, a signal may be a message. A reference signal can be also abbreviated as an RS (Reference Signal), or may be referred to as a pilot or a pilot signal depending on standards to be applied. Furthermore, a Component Carrier (CC) may be referred to as a cell, a frequency carrier and a carrier frequency.

A radio frame may include one or a plurality of durations (frames) in a time domain. Each of one or a plurality of durations (frames) that composes a radio frame may be referred to as a subframe. Furthermore, the subframe may include one or a plurality of slots in the time domain. The subframe may be a fixed time duration (e.g., 1 ms) that does not depend on the numerologies.

In this regard, the numerology may be a communication parameter to be applied to at least one of transmission and reception of a certain signal or channel. The numerology may indicate at least one of, for example, a SubCarrier Spacing (SCS), a bandwidth, a symbol length, a cyclic prefix length, a Transmission Time Interval (TTI), the number of symbols per TTI, a radio frame configuration, specific filtering processing performed by a transceiver in a frequency domain, and specific windowing processing performed by the transceiver in a time domain.

The slot may include one or a plurality of symbols (Orthogonal Frequency Division Multiplexing (OFDM) symbols or Single Carrier-frequency Division Multiple Access (SC-FDMA) symbols) in the time domain. Furthermore, the slot may be a time unit based on the numerologies.

The slot may include a plurality of mini slots. Each mini slot may include one or a plurality of symbols in the time domain. Furthermore, the mini slot may be referred to as a subslot. The mini slot may include a smaller number of symbols than those of the slot. The PDSCH (or the PUSCH) to be transmitted in larger time units than that of the mini slot may be referred to as a PDSCH (PUSCH) mapping type A. The PDSCH (or the PUSCH) to be transmitted by using the mini slot may be referred to as a PDSCH (PUSCH) mapping type B.

The radio frame, the subframe, the slot, the mini slot and the symbol each indicate a time unit for conveying signals. The other corresponding names may be used for the radio frame, the subframe, the slot, the mini slot and the symbol. In addition, time units such as a frame, a subframe, a slot, a mini slot and a symbol in the present disclosure may be interchangeably read.

For example, 1 subframe may be referred to as a Transmission Time Interval (TTI), a plurality of contiguous subframes may be referred to as TTIs, or 1 slot or 1 mini slot may be referred to as a TTI. That is, at least one of the subframe and the TTI may be a subframe (1 ms) according to legacy LTE, may be a duration (e.g., 1 to 13 symbols)) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling of radio communication. For example, in the LTE system, the base station performs scheduling for allocating radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block or codeword, or may be a processing unit of scheduling or link adaptation. In addition, when the TTI is given, a time period (e.g., the number of symbols) in which a transport block, a code block or a codeword is actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe, a long subframe or a slot. A TTI shorter than the general TTI may be referred to as a reduced TTI, a short TTI, a partial or fractional TTI, a reduced subframe, a short subframe, a mini slot, a subslot or a slot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

A Resource Block (RB) is a resource allocation unit of the time domain and the frequency domain, and may include one or a plurality of contiguous subcarriers in the frequency domain. The numbers of subcarriers included in RBs may be the same irrespectively of a numerology, and may be, for example, 12. The numbers of subcarriers included in the RBs may be determined based on the numerology.

Furthermore, the RB may include one or a plurality of symbols in the time domain or may have the length of 1 slot, 1 mini slot, 1 subframe or 1 TTI. 1 TTI or 1 subframe may each include one or a plurality of resource blocks.

In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

A Bandwidth Part (BWP) (that may be referred to as a partial bandwidth) may mean a subset of contiguous common Resource Blocks (common RBs) for a certain numerology in a certain carrier. In this regard, the common RB may be specified by an RB index based on a common reference point of the certain carrier. A PRB may be defined based on a certain BWP, and may be numbered in the certain BWP.

The BWP may include a BWP for UL (UL BWP) and a BWP for DL (DL BWP). One or a plurality of BWPs in 1 carrier may be configured to the UE.

At least one of the configured BWPs may be active, and the UE may not assume that a given signal/channel is transmitted and received outside the active BWP. In addition, a "cell" and a "carrier" in the present disclosure may be read as a "BWP".

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and the parameters described in the present disclosure may be expressed by using absolute values, may be expressed by using relative values with respect to given values or may be expressed by using other corresponding information. For example, a radio resource may be instructed by a given index.

Names used for parameters in the present disclosure are in no respect restrictive names. Furthermore, numerical expressions that use these parameters may be different from those explicitly disclosed in the present disclosure. Various channels (the Physical Uplink Control Channel (PUCCH and the Physical Downlink Control Channel (PDCCH)) and information elements can be identified based on various suitable names. Therefore, various names assigned to these various channels and information elements are in no respect restrictive names.

The information and the signals described in the present disclosure may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or arbitrary combinations of these.

Furthermore, the information and the signals can be output at least one of from a higher layer to a lower layer and from the lower layer to the higher layer. The information and the signals may be input and output via a plurality of network nodes.

The input and output information and signals may be stored in a specific location (e.g., memory) or may be managed by using a management table. The information and signals to be input and output can be overridden, updated or additionally written. The output information and signals may be deleted. The input information and signals may be transmitted to other apparatuses.

Notification of information is not limited to the aspects/embodiment described in the present disclosure and may be performed by using other methods. For example, the information may be notified by a physical layer signaling (e.g., Downlink Control Information (DCI) and Uplink Control Information (UCI)), a higher layer signaling (e.g., a Radio Resource Control (RRC) signaling, broadcast information (a Master Information Block (MIB) and a System Information Block (SIB)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be given implicitly (by, for example, not giving notification of the given information or by giving notification of another information).

Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or is referred to as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using at least ones of wired techniques (e.g., coaxial cables, optical fiber cables, twisted pairs and Digital Subscriber Lines (DSLs)) and radio techniques (e.g., infrared rays and microwaves), at least ones of these wired techniques and radio techniques are included in a definition of the transmission media.

The terms "system" and "network" used in the present disclosure can be interchangeably used.

In the present disclosure, terms such as "preceding", a "precoder", a "weight (preceding weight)", "Quasi-Co-Location (QCL)", "transmission power", "phase rotation", an "antenna port", an "antenna port group", a "layer", "the number of layers", a "rank", a "beam", a "beam width", a "beam angle", an "antenna", an "antenna element" and a "panel" can be interchangeably used.

In the present disclosure, terms such as a "base Station (BS)", a "radio base station", a "fixed station", a "NodeB", an "eNodeB (eNB)", a "gNodeB (gNB)", an "access point", a "Transmission Point (TP)", a "Reception Point (RP)", a "Transmission/Reception Point (TRP)", a a "cell", a "sector", a "cell group", a "carrier" and a "component carrier" can be interchangeably used. The base station is also referred to as terms such as a macro cell, a small cell, a femtocell or a picocell.

The base station can accommodate one or a plurality of (e.g., three) cells. When the base station accommodates a plurality of cells, an entire coverage area of the base station can be partitioned into a plurality of smaller areas. Each smaller area can also provide a communication service via a base station subsystem (e.g., indoor small base station (RRH: Remote Radio Head)). The term "cell" or "sector" indicates part or the entirety of the coverage area of at least one of the base station and the base station subsystem that provide a communication service in this coverage.

In the present disclosure, the terms such as "Mobile Station (MS)", "user terminal", "user apparatus (UE: User Equipment)" and "terminal" can be interchangeably used.

The mobile station is also referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

At least one of the base station and the mobile station may be referred to as a transmission apparatus, a reception apparatus or a communication apparatus. In addition, at least one of the base station and the mobile station may be a device mounted on a movable body or the movable body itself. The movable body may be a vehicle (e.g., a car or an airplane), may be a movable body (e.g., a drone or a self-driving car) that moves unmanned or may be a robot (a manned type or an unmanned type). In addition, at least one of the base station and the mobile station includes an apparatus, too, that does not necessarily move during a communication operation. For example, at least one of the base station and the mobile station may be an Internet of Things (IoT) device such as a sensor.

Furthermore, the base station in the present disclosure may be read as the user terminal. For example, each aspect/embodiment of the present disclosure may be applied to a configuration where communication between the base station and the user terminal is replaced with communication between a plurality of user terminals (that may be referred to as, for example, Device-to-Device (D2D) or Vehicle-to-Everything (V2X)). In this case, the user terminal 20 may be configured to include the functions of the above-described base station 10. Furthermore, words such as "uplink" and "downlink" may be read as a word (e.g., a "side") that matches terminal-to-terminal communication. For example, the uplink channel and the downlink channel may be read as side channels.

Similarly, the user terminal in the present disclosure may be read as the base station. In this case, the base station 10 may be configured to include the functions of the above-described user terminal 20.

In the present disclosure, operations performed by the base station are performed by an upper node of this base station depending on cases. Obviously, in a network including one or a plurality of network nodes including the base stations, various operations performed to communicate with a terminal can be performed by base stations, one or more network nodes (that are regarded as, for example, Mobility Management Entities (MMEs) or Serving-Gateways (S-GWs), yet are not limited to these) other than the base stations or a combination of these.

Each aspect/embodiment described in the present disclosure may be used alone, may be used in combination or may be switched and used when carried out. Furthermore, orders of the processing procedures, the sequences and the flowchart according to each aspect/embodiment described in the present disclosure may be rearranged unless contradictions arise. For example, the method described in the present disclosure presents various step elements by using an exemplary order and is not limited to the presented specific order.

Each aspect/embodiment described in the present disclosure may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods, or next-generation systems that are expanded based on these systems. Furthermore, a plurality of systems may be combined (e.g., a combination of LTE or LTE-A and 5G) and applied.

The phrase "based on" used in the present disclosure does not mean "based only on" unless specified otherwise. In other words, the phrase "based on" means both of "based only on" and "based at least on".

Every reference to elements that use names such as "first" and "second" used in the present disclosure does not generally limit the quantity or the order of these elements. These names can be used in the present disclosure as a convenient method for distinguishing between two or more elements. Hence, the reference to the first and second elements does not mean that only two elements can be employed or the first element should precede the second element in some way.

The term "deciding (determining)" used in the present disclosure includes diverse operations in some cases. For example, "deciding (determining)" may be regarded to "decide (determine)" judging, calculating, computing, processing, deriving, investigating, looking up, search and inquiry (e.g., looking up in a table, a database or another data structure), and ascertaining.

Furthermore, "deciding (determining)" may be regarded to "decide (determine)" receiving (e.g., receiving information), transmitting (e.g., transmitting information), input, output and accessing (e.g., accessing data in a memory).

Furthermore, "deciding (determining)" may be regarded to "decide (determine)" resolving, selecting, choosing, establishing and comparing. That is, "deciding (determining)" may be regarded to "decide (determine)" some operation.

Furthermore, "deciding (determining)" may be read as "assuming", "expecting" and "considering".

The words "connected" and "coupled" used in the present disclosure or every modification of these words can mean every direct or indirect connection or coupling between 2 or more elements, and can include that 1 or more intermediate elements exist between the two elements "connected" or "coupled" with each other. The elements may be coupled or connected physically or logically or by a combination of these physical and logical connections. For example, "connection" may be read as "access".

It can be understood in the present disclosure that, when connected, the two elements are "connected" or "coupled" with each other by using 1 or more electric wires, cables or printed electrical connection, and by using electromagnetic energy having wavelengths in radio frequency domains, microwave domains or (both of visible and invisible) light domains in some non-restrictive and non-comprehensive examples.

A sentence that "A and B are different" in the present disclosure may mean that "A and B are different from each other". In this regard, the sentence may mean that "A and B are each different from C". Words such as "separate" and "coupled" may be also interpreted in a similar way to "different".

When the words "include" and "including" and modifications of these words are used in the present disclosure, these words intend to be comprehensive similar to the word "comprising". Furthermore, the word "or" used in the present disclosure intends not to be an exclusive OR.

When, for example, translation adds articles such as a, an and the in English in the present disclosure, the present disclosure may include that nouns coming after these articles are plural.

The invention according to the present disclosure has been described in detail above. However, it is obvious for a person skilled in the art that the invention according to the present disclosure is not limited to the embodiment described in the present disclosure. The invention according to the present disclosure can be carried out as modified and changed aspects without departing from the gist and the scope of the invention defined based on the recitation of the claims. Accordingly, the description of the present disclosure is intended for exemplary explanation, and does not bring any restrictive meaning to the invention according to the present disclosure.

The invention claimed is:

1. A terminal comprising:
a receiver that receives a first downlink control information for use in scheduling a downlink shared channel, and a second downlink control information for use in triggering a channel state information (CSI) reference signal (CSI-RS); and
a processor that, when a resource of the CSI-RS is indicated by the second downlink control information, assumes that the resource of the CSI-RS is not used for the downlink shared channel,
wherein a plurality of candidates of the resource indicated by the second downlink control information is configured by a radio resource control (RRC) signaling, and
wherein the plurality of candidates each contains an index, the index corresponding to a code point of a bit field included in the second downlink control information, and the resource is indicated by notification of the index corresponding to the code point.

2. A radio communication method for a terminal, comprising:
receiving a first downlink control information for use in scheduling a downlink shared channel, and a second downlink control information for use in triggering a channel state information (CSI) reference signal (CSI-RS); and
when a resource of the CSI-RS is indicated by the second downlink control information, assuming that the resource of the CSI-RS is not used for the downlink shared channel,
wherein a plurality of candidates of the resource indicated by the second downlink control information is configured by a radio resource control (RRC) signaling, and
wherein the plurality of candidates each contains an index, the index corresponding to a code point of a bit field included in the second downlink control information, and the resource is indicated by notification of the index corresponding to the code point.

3. A base station comprising:
a transmitter that transmits a first downlink control information for use in scheduling a downlink shared channel, and a second downlink control information for use in triggering a channel state information (CSI) reference signal (CSI-RS); and
a processor that, when the second downlink control information indicates a resource of the CSI-RS, performs a control so as not to use the resource of the CSI-RS for the downlink shared channel,
wherein the processor configures, by a radio resource control (RRC) signaling, a plurality of candidates of the resource indicated by the second downlink control information, and
wherein the plurality of candidates each contains an index, the index corresponding to a code point of a bit field included in the second downlink control information, and the processor indicates the resource by using the code point.

4. A system comprising a base station and a terminal, wherein:
the base station comprises:
a transmitter that transmits a first downlink control information for use in scheduling a downlink shared channel, and a second downlink control information for use in triggering a channel state information (CSI) reference signal (CSI-RS); and
a first processor that, when the second downlink control information indicates a resource of the CSI-RS, performs a control so as not to use the resource of the CSI-RS for the downlink shared channel,
wherein the first processor configures, by a radio resource control (RRC) signaling, a plurality of candidates of the resource indicated by the second downlink control information, and
wherein the plurality of candidates each contains an index, the index corresponding to a code point of a bit field included in the second downlink control information, and the first processor indicates the resource by using the code point; and
the terminal comprises:
a receiver that receives the first downlink control information and the second downlink control information; and
a second processor that, when the resource of the CSI-RS is indicated by the second downlink control information, assumes that the resource of the CSI-RS is not used for the downlink shared channel.

* * * * *